United States Patent
Takasu

(10) Patent No.: US 9,903,320 B2
(45) Date of Patent: Feb. 27, 2018

(54) CONTROL SYSTEM FOR INTERNAL COMBUSTION ENGINE

(71) Applicant: TOYOTA JIDOSHA KABUSHIKI KAISHA, Toyota-shi, Aichi-ken (JP)

(72) Inventor: Yusuke Takasu, Sunto-gun (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 28 days.

(21) Appl. No.: 15/031,427

(22) PCT Filed: Nov. 10, 2014

(86) PCT No.: PCT/JP2014/080282
§ 371 (c)(1),
(2) Date: Apr. 22, 2016

(87) PCT Pub. No.: WO2015/093204
PCT Pub. Date: Jun. 25, 2015

(65) Prior Publication Data
US 2016/0281652 A1    Sep. 29, 2016

(30) Foreign Application Priority Data
Dec. 20, 2013   (JP) .................................. 2013-263909

(51) Int. Cl.
*F02D 41/00*    (2006.01)
*F02M 26/34*    (2016.01)
(Continued)

(52) U.S. Cl.
CPC ............. *F02M 26/50* (2016.02); *F02B 37/04* (2013.01); *F02B 37/10* (2013.01); *F02B 37/16* (2013.01);
(Continued)

(58) Field of Classification Search
CPC ........ F02M 26/50; F02M 26/03; F02M 26/04; F02M 26/08; F02M 26/34; F02M 26/35;
(Continued)

(56) References Cited

U.S. PATENT DOCUMENTS 5,771,868 A * 6/1998 Khair ................... F02B 33/32
                                                      123/568.12
5,927,075 A * 7/1999 Khair ................... F02M 26/06
                                                      123/565
(Continued)

FOREIGN PATENT DOCUMENTS

JP    08-291773 A    11/1996
JP    2005-220822 A   8/2005
(Continued)

*Primary Examiner* — Thomas Moulis
*Assistant Examiner* — John Bailey
(74) *Attorney, Agent, or Firm* — Finnegan, Henderson, Farabow, Garrett & Dunner, LLP

(57) ABSTRACT

A control system is applied to an internal combustion engine. The internal combustion engine includes an electric compressor provided in an intake passage, a bypass passage which bypasses the electric compressor, a low pressure EGR passage which connects a section of the intake passage, which is positioned upstream more than the electric compressor, and an exhaust passage, and a low pressure EGR valve provided in the low pressure EGR passage. An ECU, when a predetermined pressure accumulation condition where a gas flow rate of a specific place of the intake passage has become equal to or less than a predetermined amount, is satisfied, first executes a pressure accumulation control where the bypass valve is closed and the electric compressor is activated, and then, when an opening condition is satisfied during an execution of the pressure accumulation control, opens the low pressure EGR valve and opens the bypass valve.

9 Claims, 5 Drawing Sheets

(51) Int. Cl.
*F02M 26/50* (2016.01)
*F02B 37/16* (2006.01)
*F02B 37/18* (2006.01)
*F02M 26/04* (2016.01)
*F02D 41/26* (2006.01)
*F02B 37/10* (2006.01)
*F02D 41/12* (2006.01)
*F02B 37/04* (2006.01)
*F02B 39/10* (2006.01)
*F02M 26/03* (2016.01)
*F02M 26/08* (2016.01)
*F02M 26/35* (2016.01)

(52) U.S. Cl.
CPC ............ *F02B 37/183* (2013.01); *F02B 39/10* (2013.01); *F02D 41/0005* (2013.01); *F02D 41/0007* (2013.01); *F02D 41/0055* (2013.01); *F02D 41/0065* (2013.01); *F02D 41/0077* (2013.01); *F02D 41/123* (2013.01); *F02D 41/26* (2013.01); *F02M 26/03* (2016.02); *F02M 26/04* (2016.02); *F02M 26/08* (2016.02); *F02M 26/34* (2016.02); *F02M 26/35* (2016.02); *Y02T 10/144* (2013.01); *Y02T 10/42* (2013.01); *Y02T 10/47* (2013.01)

(58) Field of Classification Search
CPC .......... F02B 37/04; F02B 37/10; F02B 37/16; F02B 37/183; F02B 39/10; F02D 41/0005; F02D 41/007; F02D 41/0055; F02D 41/0065; F02D 41/0077; F02D 41/123; F02D 41/26; Y02T 10/01
USPC ................ 701/103, 108, 114; 123/565, 383, 123/568.26, 325, 332, 333, 351, 481, 493, 123/482, 497; 60/278, 279, 605.2, 607, 60/609, 610, 606, 608, 600, 601, 611, 60/612, 619, 602, 603, 605.1, 597, 598, 60/599, 604, 605.3
See application file for complete search history.

(56) References Cited

U.S. PATENT DOCUMENTS

| | | | |
|---|---|---|---|
| 6,062,026 A * | 5/2000 | Woollenweber | F02B 37/04 60/605.2 |
| 6,907,867 B2* | 6/2005 | Igarashi | F02B 29/04 123/564 |
| 6,938,420 B2* | 9/2005 | Kawamura | F02B 33/34 123/562 |
| 8,056,546 B2* | 11/2011 | Boyer | F02B 47/08 123/302 |
| 9,309,837 B2* | 4/2016 | Ulrey | F02D 41/0065 |
| 2001/0045090 A1* | 11/2001 | Gray, Jr. | B01D 53/9495 60/278 |
| 2009/0222188 A1* | 9/2009 | Igarashi | F02B 37/16 701/102 |
| 2011/0131975 A1* | 6/2011 | Styles | F02D 9/16 60/602 |
| 2011/0132322 A1* | 6/2011 | Boyer | F02B 47/08 123/337 |
| 2013/0125542 A1* | 5/2013 | Hayakawa | F01N 3/103 60/602 |
| 2015/0047317 A1* | 2/2015 | Ulrey | F02B 47/08 60/273 |
| 2015/0047618 A1* | 2/2015 | Ulrey | F02D 41/0065 123/568.12 |
| 2015/0337850 A1* | 11/2015 | An | F02B 39/00 60/605.3 |
| 2016/0265468 A1* | 9/2016 | Takayanagi | F02B 37/013 |

FOREIGN PATENT DOCUMENTS

| | | | |
|---|---|---|---|
| JP | 2007-198310 A | | 8/2007 |
| JP | 2008-75485 | | 4/2008 |
| JP | 2008-274833 | | 11/2008 |
| JP | 2008-280923 | | 11/2008 |
| JP | 2008274833 A | * | 11/2008 |
| JP | 2010-180711 | | 8/2010 |
| JP | 2012-246791 A | | 12/2012 |

* cited by examiner

– 1 –

CONTROL SYSTEM FOR INTERNAL COMBUSTION ENGINE

CROSS-REFERENCE TO RELATED APPLICATIONS

This application is a national phase application of International Application No. PCT/JP2014/080282, filed Nov. 10, 2014, and claims the priority of Japanese Application No. 2013-263909, filed Dec. 20, 2013, the content of both of which is incorporated herein by reference.

TECHNICAL FIELD

The present invention relates to a control system applied to an internal combustion engine where: a compressor to be driven by an electric motor is provided in an intake passage; and a section of the intake passage, which is positioned upstream more than the compressor, and an exhaust passage are connected by an exhaust gas recirculation (EGR) passage.

BACKGROUND ART

There is known an internal combustion engine where a compressor of a turbocharger is provided in an intake passage and an electric compressor is provided on an upstream side of the compressor (see Patent Literature 1). In addition, there are Patent Literatures 2, 3 as prior art references in relation to the present invention.

CITATION LIST

Patent Literature

Patent Literature 1: JP 2008-075485 A
Patent Literature 2: JP 2010-180711 A
Patent Literature 3: JP 2008-280923 A

SUMMARY OF INVENTION

Technical Problem

In the internal combustion engine of the Patent Literature 1, when exhaust gas is recirculated to the intake passage which is positioned upstream more than the electric compressor, there is a possibility that condensed water is generated in an exhaust gas recirculation (EGR) passage which connects an exhaust passage and the intake passage. And, when the condensed water is accumulated in the EGR passage, there is a possibility that the condensed water causes a corrosion of a pipe that composes the EGR passage.

In view of the foregoing, one object of the present invention is to provide a control system for an internal combustion engine capable of suppressing an accumulation of the condensed water in the EGR passage.

Solution to Problem

A control system of the present invention is applied to an internal combustion engine, the internal combustion engine including: a compressor which is provided in an intake passage; an electric motor which is capable of driving the compressor; a bypass passage which connects a first section of the intake passage, the first section being positioned upstream more than the compressor, and a second section of the intake passage, the second section being positioned downstream more than the compressor; a bypass valve which is provided in the bypass passage; an EGR passage which connects the first section positioned upstream more than the compressor, and an exhaust passage; and an EGR valve which is provided in the EGR passage, wherein the control system includes a control device which: when a predetermined pressure accumulation condition where a gas flow rate of a specific place of the second section positioned downstream more than the compressor, has become equal to or less than a predetermined amount, is satisfied, first executes a pressure accumulation control to close the bypass valve and make the electric motor drive the compressor; and then, when a predetermined opening condition is satisfied during an execution of the pressure accumulation control, opens the bypass valve and, if the EGR valve is closed, opens the EGR valve.

When the predetermined pressure accumulation condition is satisfied, the gas flow rate of the specific place of the second section of the intake passage, which is positioned downstream more than the compressor, has become equal to or less than the predetermined amount. Thereby, in such a case, by closing the bypass valve and activating the compressor, it is possible to pressurize and accumulate the gas in the second section which is positioned downstream more than the compressor. In the control system of the present invention, when the opening condition is satisfied while the gas is accumulated in such a way, the bypass valve is opened and the EGR valve is also opened. Thereby, it is possible to lead into the EGR passage the gas pressurized. Thereby, it is possible to remove condensed water existing in the EGR passage to the exhaust passage by the pressurized gas. Accordingly, it is possible to suppress an accumulation of the condensed water in the EGR passage.

In one embodiment of the control system of the present invention, the control device, when as the pressure accumulation condition is satisfied, the electric motor is made to drive the compressor, may control the electric motor so that gas is accumulated in the second section positioned downstream more than the compressor in a range where the gas does not flow back to an upstream side of the compressor from a downstream side of the compressor by passing through an inside of the compressor. According to this embodiment, when the gas is accumulated in the second section positioned downstream more than the compressor, it is possible to suppress generating a surging of the compressor.

In one embodiment of the control system of the present invention, the control system may further includes a condensed water determination device which determines whether or not condensed water is accumulated in the EGR passage, wherein the control device, when the pressure accumulation condition is satisfied and the condensed water determination device determines that the condensed water is accumulated in the EGR passage, may first execute the pressure accumulation control, and then, when the opening condition is satisfied during the execution of the pressure accumulation control, may open the bypass valve and, if the EGR valve is closed, may open the EGR valve. In this embodiment, when it is determined that the condensed water is accumulated in the EGR passage, the compressor is driven by the electric motor. Thereby, it is possible to decrease the number of times the electric motor operates. In this case, since it is possible to decrease energy which is expended by the electric motor, it is possible to improve an energy efficiency.

In one embodiment of the control system of the present invention, a throttle valve may be provided in a portion which is positioned upstream more than a position where the bypass passage connects with the intake passage and also upstream more than a position where the EGR passage connects with the intake passage, in the first section positioned upstream more than the compressor, and the control device may open the throttle valve when the pressure accumulation condition is satisfied, and may close the throttle valve when the opening condition is satisfied during the execution of the pressure accumulation control. In this embodiment, when the pressurized gas is led into the EGR passage, the throttle valve is closed. Thereby, it is possible to suppress discharging of the pressurized gas to the atmosphere via the intake passage. Accordingly, it is possible to increase an amount of the pressurized gas which is led into the EGR passage.

In one embodiment of the control system of the present invention, the control device may close the EGR valve when the pressure accumulation condition is satisfied. By closing the EGR valve in this manner, it is possible to suppress a move of the condensed water existing in the EGR passage to an intake passage side during the execution of the pressure accumulation control.

In one embodiment of the control system of the present invention, the internal combustion engine may further include a high pressure EGR passage which connects the second section positioned downstream more than the compressor and the exhaust passage, and the specific place may be set to a place positioned upstream more than a position where the high pressure EGR passage connects with the intake passage in the second section positioned downstream more than the compressor. When the gas flow rate of a portion which is positioned upstream more than a connecting position of the high pressure EGR passage in the second section positioned downstream more than the compressor, is equal to or less than the predetermined amount, even though exhaust gas is recirculated via the high pressure EGR passage, it is possible to accumulate the gas in the second section positioned downstream more than the compressor by the compressor. Thereby, such a place is set to the specific place.

The internal combustion engine to which the present invention is applied, may be provided with a supercharger in addition to the compressor in the intake passage. For example, a turbocharger may be provided in the internal combustion engine, a compressor of the turbocharger may be located in the second section positioned downstream more than the compressor, and a turbine of the turbocharger may be located in the exhaust passage.

DESCRIPTION OF EMBODIMENTS

Figure 1:
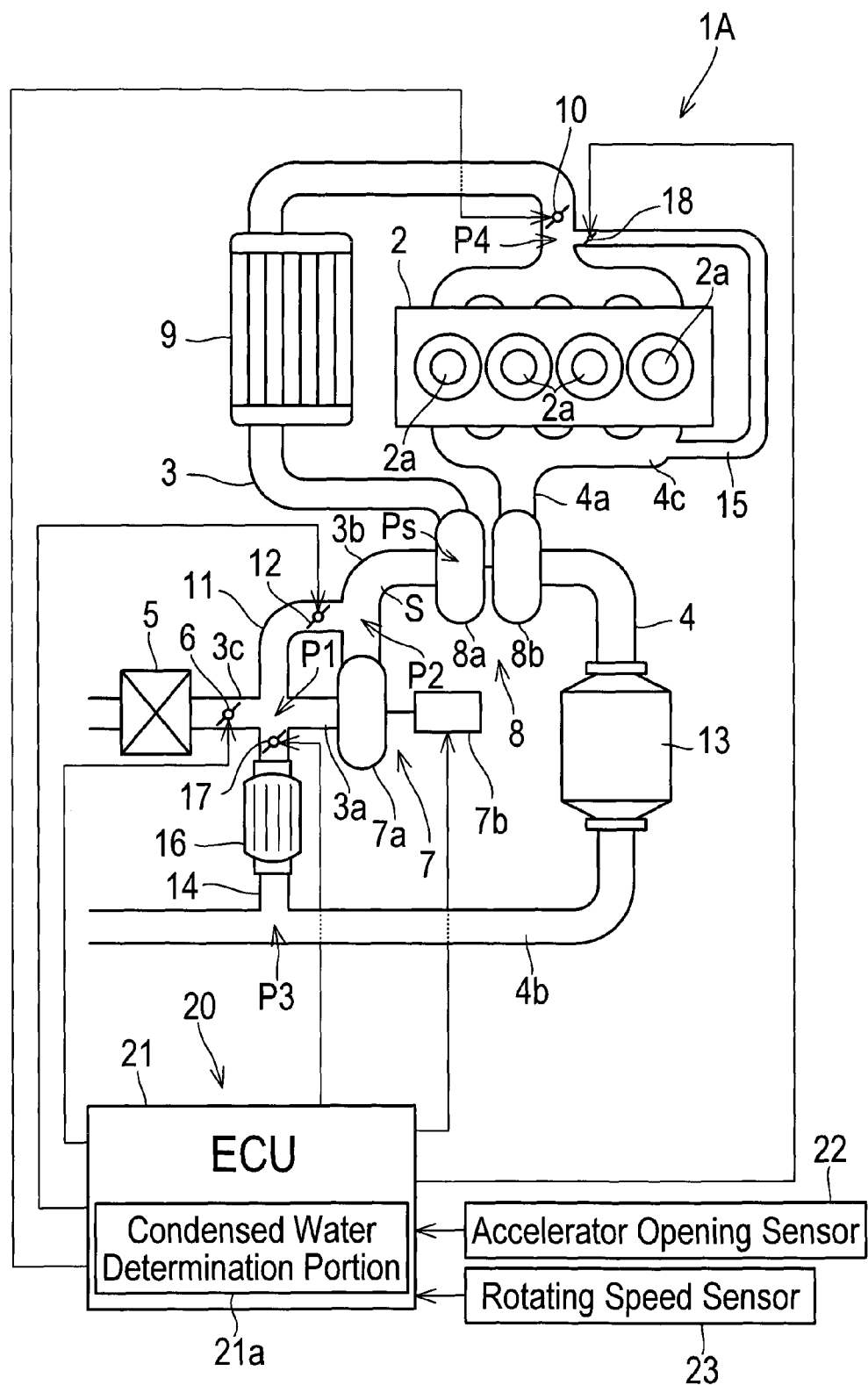
FIG. 1 is a schematic diagram showing main portions of an internal combustion engine where a control system according to one embodiment of the present invention is incorporated.

FIG. 1 schematically shows main portions of an internal combustion engine where a control system according to one embodiment of the present invention is incorporated. The internal combustion engine (hereinafter, referred to as an engine) 1A is configured as a diesel engine mounted on a vehicle as a traveling power source. The engine 1A has an engine body 2 being provided with four cylinders 2a. Each cylinder 2a is connected with an intake passage 3 and an exhaust passage 4.

The intake passage 3 is provided with an air cleaner 5 for filtering intake gas, a first throttle valve 6, an electric compressor 7, a compressor 8a of a turbocharger 8, an intercooler 9 for cooling the intake gas, and a second throttle valve 10, in order from the upstream. The first throttle valve 6 and the second throttle valve 10 are well known valves provided for opening and closing the intake passage 3. The electric compressor 7 includes a compressor 7a which is provided in the intake passage 3 and an electric motor 7b for driving the compressor 7a. The electric compressor 7 is a well known apparatus where the compressor 7a is driven by the electric motor 7b and a supercharging is performed thereby. The turbocharger 8 is a well known supercharger where a turbine 8b provided in the exhaust passage 4 is rotated with energy of exhaust gas to make the compressor 8a drive, and a supercharging is performed thereby.

Furthermore, the intake passage 3 is provided with a bypass passage 11. The bypass passage 11 is provided for flowing the intake gas bypassing the electric compressor 7. As shown in this figure, the bypass passage 11 connects a section 3a (a first section) which is positioned upstream more than the electric compressor 7 in the intake passage 3 and a section 3b (a second section) which is positioned downstream more than the electric compressor 7 in the intake passage 3. A first end of the bypass passage 11 is connected to a position P1 which is positioned upstream more than the electric compressor 7 and also positioned downstream more than the first throttle valve 6 in the section 3a. A second end of the bypass passage 11 is connected to a position P2 which is positioned downstream more than the electric compressor 7 and also positioned downstream more than the compressor 8a in the section 3b. The bypass passage 11 is provided with a bypass valve 12 for opening and closing the bypass passage 11.

The exhaust passage 4 is provided with the turbine 8b of the turbocharger 8 and an exhaust gas purifying apparatus 13 for purifying exhaust gas, in order from the upstream. As the exhaust gas purifying apparatus 13, a well known particulate filter which collects particulate matters in the exhaust gas is provided, for example.

The intake passage 3 and the exhaust passage 4 are connected with each other by each of a low pressure EGR passage 14 and a high pressure EGR passage 15. The low pressure EGR passage 14 connects a section 4b which is positioned downstream more than the turbine 8b in the exhaust passage 4 and the section 3a which is positioned upstream more than the electric compressor 7 in the intake passage 3. As shown in this figure, a first end of the low pressure EGR passage 14 is connected to a position P3 where is positioned downstream more than the exhaust gas purifying apparatus 13 in the section 4b of the exhaust passage 4. A second end of the low pressure EGR passage 14 is connected to the position P1 which is positioned upstream more than the electric compressor 7 and also positioned downstream more than the first throttle valve 6 in the section 3a of the intake passage 3. Thereby, as shown in this figure, the first throttle valve 6 is provided on a portion 3c which is positioned upstream more than a connecting position P1 of the bypass passage 11 and also positioned upstream more than the connecting position P1 of the low pressure EGR passage 14 in the section 3a of the intake passage 3.

The low pressure EGR passage 14 is provided with an EGR cooler 16 for cooling the exhaust gas and a low pressure EGR valve 17. The low pressure EGR valve 17 is a well known valve for opening and closing the low pressure EGR passage 14. The high pressure EGR passage 15 connects a section 4a which is positioned upstream more than the turbine 8b in the exhaust passage 4 and the section 3b which is positioned downstream more than the electric compressor 7 in the intake passage 3. As shown in this figure, a first end of the high pressure EGR passage 15 is connected to an exhaust manifold 4c which composes a part of the exhaust passage 4. A second end of the high pressure EGR passage 15 is connected to a position P4 which is positioned downstream more than the second throttle valve 10 in the section 3b of the intake passage 3. The high pressure EGR passage 15 is provided with a high pressure EGR valve 18 for opening and closing the high pressure EGR passage 15.

In the engine 1A, a control system 20 is incorporated. The control system 20 includes an electronic control unit (ECU) 21. The ECU 21 is a well known control apparatus which controls an operating state of the engine 1A based on output signals of various sensors which are provided on the engine 1A. The ECU 21 is configured as a computer unit including a microprocessor and peripheral devices, such as a RAM and a ROM, which are necessary for the operations of the microprocessor. The ECU 21 is provided with a condensed water determination portion 21a. The condensed water determination portion 21a is a logical device implemented by a combination of computer hardware of the ECU 21 and software. The ECU 21 controls the first throttle valve 6, the second throttle valve 10, the bypass valve 12, the low pressure EGR valve 17, the high pressure EGR valve 18, and the electric motor 7b of the electric compressor 7, for example. Furthermore, the ECU 21 also controls a fuel injection valve (not shown) which supplies fuel to the cylinder 2a. In addition, the ECU 21 controls various control objects which are provided on the engine 1A. The ECU 21 is connected with various sensors for detecting the operating state of the engine 1A. For example, the ECU 21 is connected with an accelerator opening sensor 22, a rotating speed sensor 23, and so on. The accelerator opening sensor 22 outputs a signal corresponding to a position of an accelerator pedal (an accelerator opening). The rotating speed sensor 23 outputs a signal corresponding to a rotating speed of the engine 1A. In addition, various sensors are further connected to the ECU 21, but they are omitted in the figure.

Next, controls which are executed by the ECU 21 will be described. The ECU 21 controls the electric motor 7b so as to operate the electric compressor 7, when a rapid increase of output power is required to the engine 1A. Furthermore, the ECU 21 controls the bypass valve 12 depending on whether or not the electric compressor 7 is in operation. Specifically, the bypass valve 12 is closed when the electric compressor 7 is in operation, and the bypass valve 12 is opened when the electric compressor 7 is stopped. The ECU 21 calculates an amount of the exhaust gas to be recirculated to the intake passage 3 based on the operating state of the engine 1A, and controls the first throttle valve 6, the second throttle valve 10, the low pressure EGR valve 17, and the high pressure EGR valve 18 so that the calculated amount of the exhaust gas is recirculated to the intake passage 3. The ECU 21 stops a fuel supply to each cylinder 2a, when a deceleration is required to the vehicle to which the engine 1A is mounted. Hereinafter, this control is referred as a fuel cut. Furthermore, the ECU 21 opens the high pressure EGR valve 18 and Closes the second throttle valve 10, when the fuel cut is performed. As a result, since it is possible to decrease an amount of gas which passes through the exhaust gas purifying apparatus 13, it is possible to keep the exhaust gas purifying apparatus 13 warm.

In addition, the ECU 21 executes a condensed water removal control for removing condensed water from the low pressure EGR passage 14. As well known, the exhaust gas includes moisture. In the low pressure EGR passage 14, the moisture in the exhaust gas sometimes condenses and accumulates in the passage and inside the EGR cooler 16. The ECU 21 operates the electric compressor 7, and pressurizes and accumulates gas in the intake passage 3. And, the ECU 21 removes the condensed water existing in the low pressure EGR passage 14 to the exhaust passage 4 by using the pressurized gas. This removal of the condensed water is performed when a predetermined pressure accumulation condition is satisfied. The predetermined pressure accumulation condition is that a gas flow rate of a specific place Ps of the section 3b which is positioned downstream more than the electric compressor 7 in the intake passage 3 is equal to or less than a predetermined amount. As the specific place Ps, an appropriate place existing between the position P2 and the position P4 in the section 3b is set. In this embodiment, as shown in FIG. 1, the compressor 8a is set as the specific place Ps. In this case, the gas flow rate of the specific place Ps corresponds to an amount of gas which is removed by the compressor 8a. As the predetermined amount, a flow rate which is less than a rated flow of the electric compressor 7 is set, for example.

Figure 2:
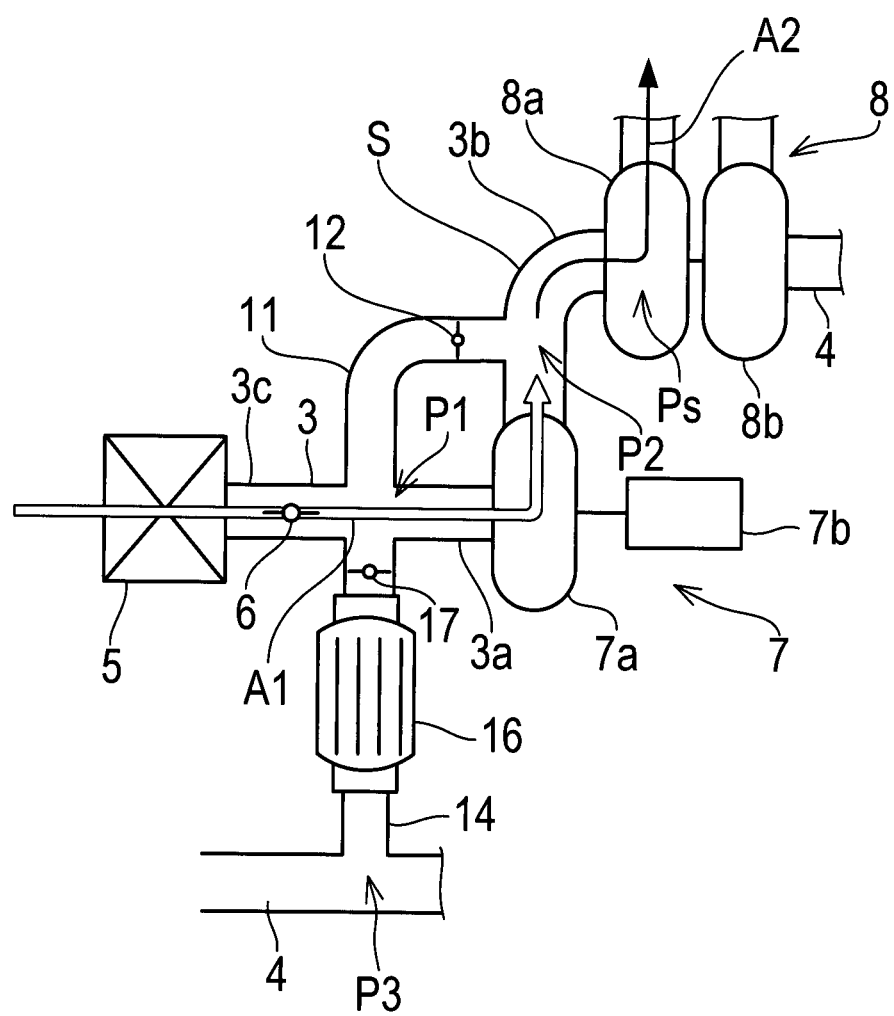
FIG. 2 is a diagram showing a part of the internal combustion engine when gas is pressurized and accumulated in an intake passage.
Figure 3:
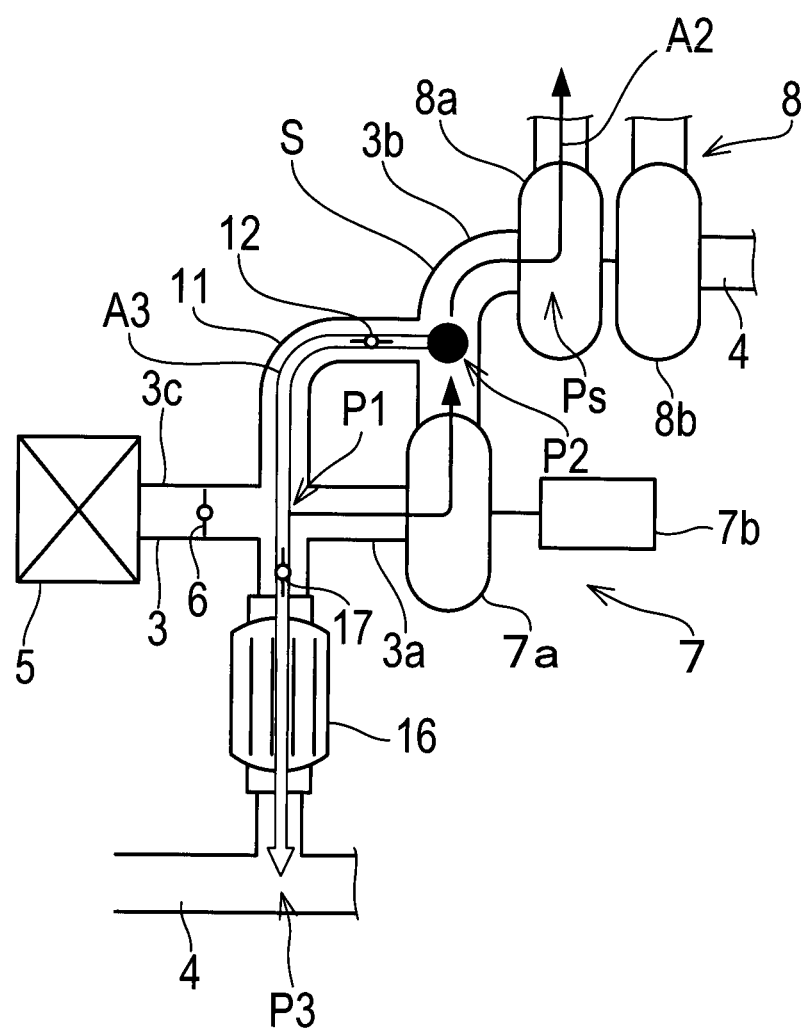
FIG. 3 is a diagram showing a part of the internal combustion engine when the pressurized gas is led into a low pressure EGR passage.

First, a method for removing the condensed water will be described with reference to FIG. 2 and FIG. 3. FIG. 2 shows a part of the engine 1A when the gas is pressurized and accumulated. FIG. 3 shows the part of the engine 1A when the pressured gas is led into the low pressure EGR passage 14. As described above, for the removal of the condensed water, first, the gas is accumulated in the intake passage 3. Specifically, the gas is accumulated in a section S existing between the electric compressor 7 and the compressor 8a in the intake passage 3. So, the ECU 21 first operates the electric compressor 7. Furthermore, as shown in FIG. 2, the ECU 21 closes the bypass valve 12 and also closes the low pressure EGR valve 17, and opens the first throttle valve 6. As a result, as shown by an arrow A1 in FIG. 2, the gas is pressurized and accumulated in the section S. In this case, as shown by an arrow A2 in FIG. 2, a part of the gas leaks toward a downstream side of the compressor 8a. However, as described above, the removal of the condensed water is performed in a case that the amount of gas which is removed by the compressor 8a is equal to or less than the predetermined amount. Thereby, an amount of the gas which leaks toward the downstream side of the compressor 8a is few. Accordingly, it is possible to pressurize and accumulate the gas in the section S. This accumulation of the gas is performed for a predetermined time, such as 1 or 2 seconds. The predetermined time is set to duration necessary for a pressure of the gas in the section S to become equal to or greater than a target pressure by the electric compressor 7. The target pressure is set to a pressure necessary for blowing off the condensed water in the low pressure EGR passage 14 to the exhaust passage 4, when the pressurized gas is led into the low pressure EGR passage 14, for example. However, when the predetermined time is too long or the target pressure is too high, the pressure in the section S becomes high, and there is a possibility that the gas flows back to an upstream side from a downstream side by passing through an inside of the compressor 7a when the gas is accumulated. So, the predetermined time and the target pressure are set so that such a back flow of the gas is not generated when the gas is accumulated. Thereby, the ECU 21 controls the electric motor 7b so that the gas is accumulated in the section 3b in a range where such a back flow of the gas is not generated, when the gas is accumulated.

After an elapse of the predetermined time, the ECU 21 stops the electric compressor 7. Furthermore, at this moment, as shown in FIG. 3, the ECU 21 opens the bypass valve 12 and the low pressure EGR valve 17. And, the ECU 21 closes the first throttle valve 6. As a result, as shown by an arrow A3 in FIG. 3, the pressurized gas which is accumulated in the section S is led into the low pressure EGR passage 14 via the bypass passage 11. Thereby, the condensed water in the low pressure EGR passage 14 is blown off to the exhaust passage 4. Accordingly, it is possible to remove the condensed water from the low pressure EGR passage 14. The condensed water which is blown off to the exhaust passage 4 is discharged to atmosphere with the exhaust gas later.

Figure 4:
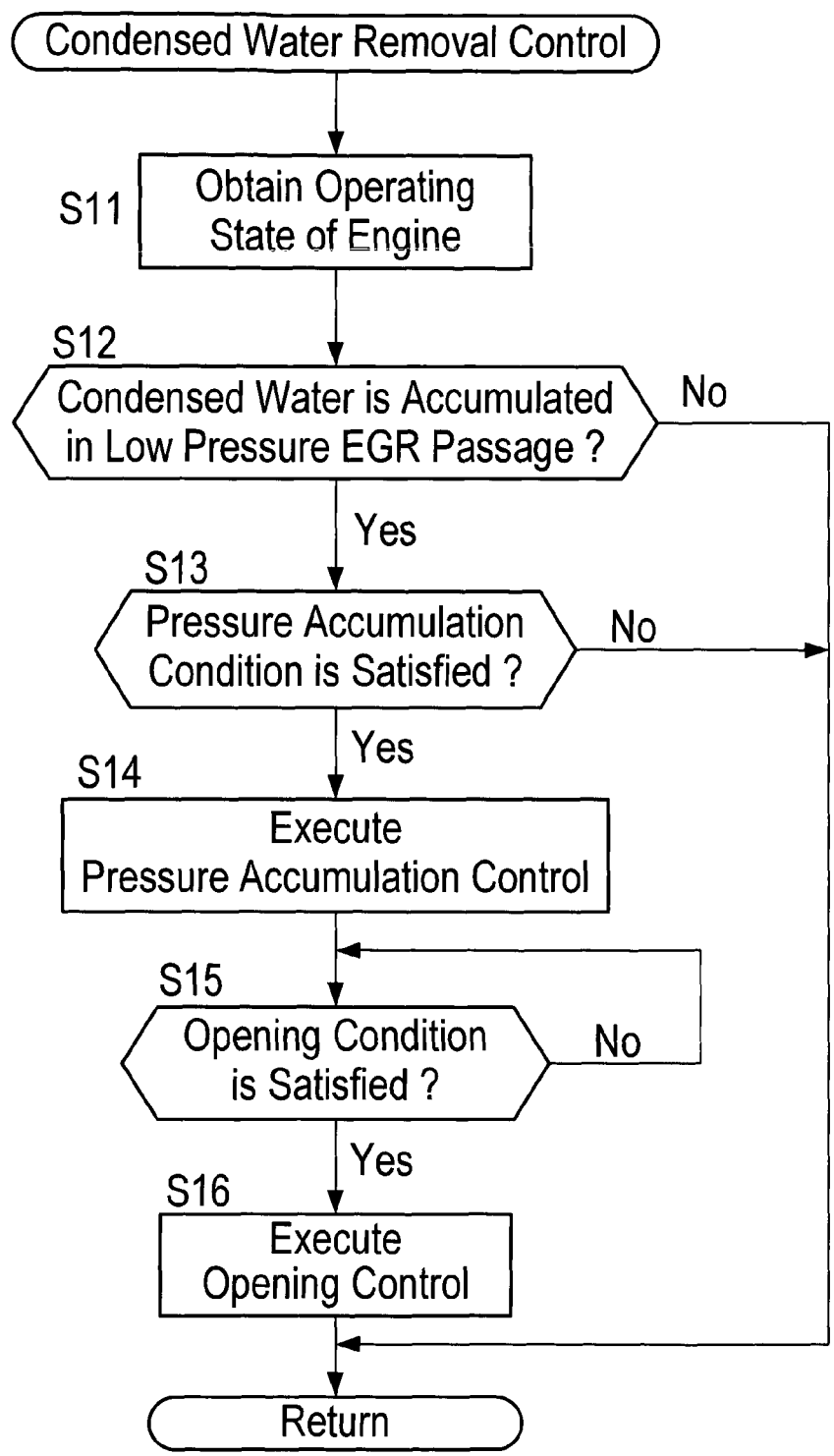
FIG. 4 is a flowchart showing a condensed water removal control routine executed by an ECU.

FIG. 4 shows a condensed water removal control routine which the ECU 21 executes for removing the condensed water in this manner. As described above, in a condensed water removal control, a pressure accumulation control for accumulating the gas and an opening control for releasing the gas are included. The ECU 21 repeatedly executes this control routine at predetermined intervals when the engine 1A is being operated. Furthermore, the ECU 21 executes this control routine in parallel to the other routines executed by the ECU 21.

In the control routine, the ECU 21 first obtains an operating state of the engine 1A in step S11. The ECU 21 obtains the accelerator opening, the rotating speed of the engine 1A, and so on as the operating state of the engine 1A. In addition, in this process, the ECU 21 also obtains various information with regard to the operating state of the engine 1A. In next step S12, the ECU 21 determines whether or not the condensed water is accumulated in the low pressure EGR passage 14. This determination is executed by the condensed water determination portion 21a. For example, a sensor capable of detecting an amount of the condensed water may be provided in the low pressure EGR passage 14 or the EGR cooler 16, and the determination may be executed based on a detection value of the sensor. Specifically, when greater than or equal to a predetermined determination amount of condensed water is accumulated in the low pressure EGR passage 14 or the EGR cooler 16, the ECU 21 (the condensed water determination portion 21a) may determine that the condensed water is accumulated in the low pressure EGR passage 14. Furthermore, by obtaining humidity in the low pressure EGR passage 14 detected by a humidity sensor, the ECU 21 (the condensed water determination portion 21a) may determine based on the humidity. Specifically, when a detection value of the humidity sensor is higher than or equal to a predetermined determination humidity, the ECU 21 (the condensed water determination portion 21a) may determine that the condensed water is accumulated in the low pressure EGR passage 14. In addition, the ECU 21 (the condensed water determination portion 21a) may make the determination based on an operating time of the engine 1A. For example, when an accumulated operating time of the engine 1A after the latest removal of the condensed water is greater than or equal to a predetermined determination time, the ECU 21 (the condensed water determination portion 21a) may determine that the condensed water is accumulated in the low pressure EGR passage 14. When the ECU 21 (the condensed water determination portion 21a) determines that the condensed water is not accumulated in the low pressure EGR passage 14, the ECU 21 ends the present control routine.

On the other hand, when the ECU 21 (the condensed water determination portion 21a) determines that the condensed water is accumulated in the low pressure EGR passage 14, the ECU 21 goes to step S13 and determines whether or not the predetermined pressure accumulation condition where the gas flow rate in the above specific place Ps, that is, the compressor 8a is equal to or less than the predetermined amount, is satisfied. The ECU 21 makes the determination based on the operating state of the engine 1A, for example. As described above, in the vehicle where the engine 1A is mounted, the fuel cut is performed when the vehicle decelerates. In this case, as described above, the second throttle valve 10 is closed. Thereby, the amount of gas which is removed by the compressor 8a becomes equal to or less than the predetermined amount. So, the ECU 21 determines that the pressure accumulation condition is satisfied, when the fuel cut is performed. Furthermore, when a large amount of the exhaust gas is recirculated via the high pressure EGR passage 15 even though the second throttle valve 10 is opened, the amount of gas which is removed by the compressor 8a becomes equal to or less than the predetermined amount. In addition, when the engine 1A is operated at a low revolution such as an idling operation and so on, it is considered that the amount of gas which is removed by the compressor 8a becomes equal to or less than the predetermined amount. So, in such cases, the ECU 21 may also determine that the pressure accumulation condition is satisfied. In addition, for example, a flow rate sensor is provided in an inlet port or an outlet port of the compressor 8a, and the ECU 21 may make a determination whether or not the pressure accumulation condition is satisfied based on a detection value of the flow rate sensor. When the ECU 21 determines that the pressure accumulation condition is not satisfied, the ECU 21 ends the present control routine.

On the other hand, when the ECU 21 determines that the pressure accumulation condition is satisfied, the ECU 21 goes to step S14 and executes a pressure accumulation control. In the pressure accumulation control, the ECU 21 opens the first throttle valve 6 and closes the low pressure EGR valve 17. Furthermore, the ECU 21 closes the bypass valve 12. And then, the ECU 21 activates the electric compressor 7. Thus, a state of the engine 1A is switched to a state shown in FIG. 2. In next step S15, the ECU 21 determines whether or not an opening condition is satisfied. The ECU 21 determines that the opening condition is satisfied, when the predetermined time is elapsed after activating the electric compressor 7, as described above. When the ECU 21 determines that the opening condition is not satisfied, the ECU 21 executes the step S15 repeatedly until the opening condition is satisfied.

On the other hand, when the ECU 21 determines that the opening condition is satisfied, the ECU 21 goes to step S16 and executes the opening control. In the opening control, the ECU 21 stops the electric compressor 7. Or, the ECU 21 reduces power of the electric compressor 7 to a degree that the opening control is not hindered. Furthermore, the ECU 21 closes the first throttle valve 6. And then, the ECU 21 opens the low pressure EGR valve 17 and the bypass valve 12. Thus, the state of the engine 1A is switched to a state shown in FIG. 3. Thereby, the pressurized gas which is accumulated in the section S is led into the low pressure EGR passage 14, and the condensed water in the low pressure EGR passage 14 is blown off to the exhaust passage 4. Thereafter, the ECU 21 ends the present control routine.

As described above, according to the control system 20 of the present invention, it is possible to remove the condensed water from the low pressure EGR passage 14 by using the electric compressor 7 and the bypass passage 11. Thereby, it is possible to suppress accumulating the condensed water in the low pressure EGR passage 14. Accordingly, it is possible to suppress corrosion of pipes which compose the low pressure EGR passage 14 and the EGR cooler 16 by the condensed water. Furthermore, in the present invention, since the condensed water is removed by using the electric compressor 7 and the bypass passage 11, it is not necessary to provide devices for removing the condensed water additionally. Thereby, it is possible to remove the condensed water at low cost.

Furthermore, in the present invention, when the gas is accumulated in the section S, the electric motor 7b is cnntrolled so that the gas is accumulated in the range where the gas does not flow back to the upstream side from the downstream side bypassing through the inside of the compressor 7a. Thereby, it is possible to suppress generating a surging in the electric compressor 7 when the gas is accumulated.

As shown in FIG. 3, in the present invention, when the pressurized gas is led into the low pressure EGR passage 14, the first throttle valve 6 is closed. Thereby, it is possible to prevent discharging the pressurized gas to the atmosphere via the air cleaner 5. Furthermore, as shown in FIG. 2, when the gas is accumulated in the section S, the low pressure EGR valve 17 is closed. Thereby, when the gas is accumulated, it is possible to suppress moving the condensed water in the low pressure EGR passage 14 to the intake passage 3 side.

In the present invention, the control for removing the condensed water may be executed regardless of whether or not the condensed water is accumulated in the low pressure EGR passage 14, when the predetermined pressure accumulation condition is satisfied. When the control for removing the condensed water is executed in this manner, thereby it is hard to accumulate the condensed water in the low pressure EGR passage 14. Thereby, it is possible to suppress accumulating the condensed water in the low pressure EGR passage 14.

In the step S15 in FIG. 4, a method for determining whether or not the opening condition is satisfied, is not limited to the above described method. For example, a pressure sensor may be provided in the section S of the intake passage 3, and the ECU 21 may determine that the opening condition is satisfied when a detection value of the pressure sensor has become equal to or greater than the above target value. Furthermore, when the gas flow rate in the specific place Ps, that is, the gas flow rate in the compressor 8a has become equal to or greater than a predetermined flow rate, the ECU 21 may determine that the opening condition is satisfied. As shown in FIG. 2, when the gas is accumulated in the section S, a part of the gas leaks via the compressor 8a as shown the arrow A2. And, a flow rate of the leaking gas is made greater as an amount of the gas which is accumulated in the section S increases. Thereby, when the gas flow rate is equal to or greater than the predetermined flow rate, it can be determined that the gas is accumulated in the section S sufficiently.

In the present invention, when the gas is accumulated in the section S, the low pressure EGR valve 17 may be opened. Even in this case, it is possible to accumulate the gas in the section S. In this case, when the opening condition is satisfied, a control for opening the low pressure EGR valve 17 may be omitted. That is, in the present invention, in a case that the low pressure EGR valve 17 is closed when the opening condition is satisfied, the low pressure EGR valve 17 may be opened.

Figure 5:
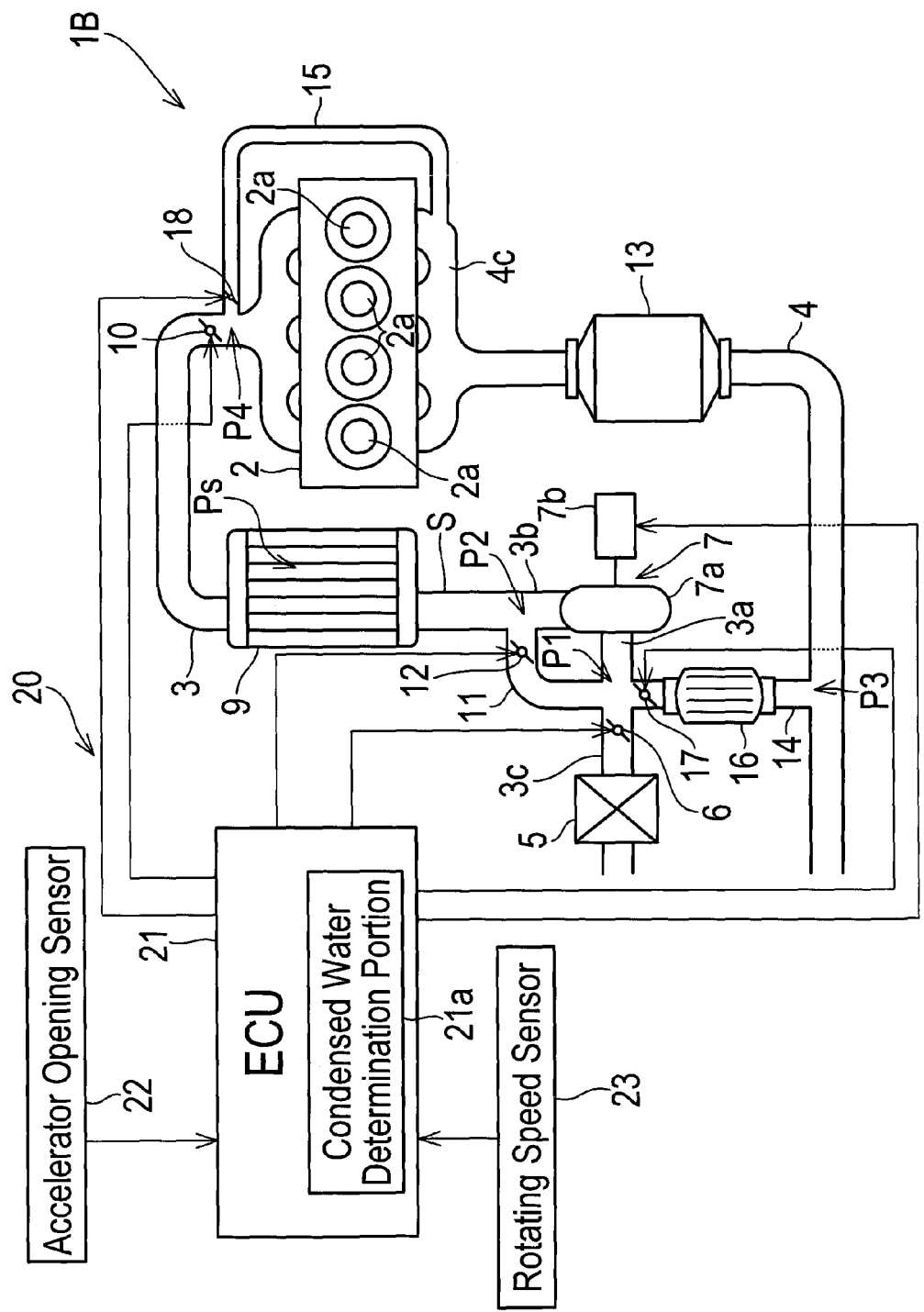
FIG. 5 is a schematic diagram showing main portions of other internal combustion engine to which the present invention is applied.

An engine to which the present invention is applied is not limited to the engine 1A shown in FIG. 1. For example, the present invention may be applied to an engine 1B shown in FIG. 5. In FIG. 5, the same components as those in FIG. 1 are denoted by the same reference numerals, and descriptions thereof will be omitted. As shown in this figure, the engine 1B does not have the turbocharger 8. The engine 1B is the same as the engine 1A shown in FIG. 1 except that the turbocharger is omitted.

Even in the engine 1B, as with the above described embodiment, by controlling the first throttle valve 6, the bypass valve 12, the low pressure EGR valve 17, and the electric compressor 7, it is possible to remove the condensed water from the low pressure EGR passage 14.

Even in the engine 1B, the specific place Ps is set an appropriate place between the position P2 and the position P4 in the section 3b. Specifically, the intercooler 9 is set as the specific place Ps, for example.

In the above described embodiment, the compressor 7a of the electric compressor 7 corresponds to a compressor of the present invention. Furthermore, the electric motor 7b of the electric compressor 7 corresponds to an electric motor of the present invention. The low pressure EGR passage 14 corresponds to an EGR passage of the present invention. The low pressure EGR valve 17 corresponds to an EGR valve of the present invention. The first throttle valve 6 corresponds to a throttle valve of the present invention. The ECU 21 corresponds to a control device of the present invention. The condensed water determination portion 21a corresponds to a condensed water determination device of the present invention.

The present invention is not limited to the above-described embodiments, and various modifications of the present invention may be provided. For example, an engine to which the present invention is applied is not limited to the diesel engine. The present invention may be applied to a spark ignition type internal combustion engine. Furthermore, a cylinder arrangement and the number of cylinders of the engine are not limited. For example, the present invention may be applied to a V-type engine or a horizontally opposed engine.

The present invention may be applied to an engine where the high pressure EGR passage is omitted and only the low pressure EGR passage is provided. Furthermore, the present invention may be applied to an engine that the first throttle valve is not provided in the intake passage.

The present invention may be applied to an engine that an electric compressor is provided on a downstream side of the compressor of the turbocharger. Furthermore, the present invention may be applied to an engine to which an electric motor assisted turbocharger (MAT) is mounted instead of the electric compressor. As well known, in the MAT, it is possible to drive the compressor by an electric motor. Thereby, it is possible to accumulate the gas in the intake passage by using the MAT instead of the electric compressor. And, it is possible to remove the condensed water existing in the EGR passage with the gas.

The invention claimed is:

1. A control system which is applied to an internal combustion engine,
the internal combustion engine including:
a compressor which is provided in an intake passage; an electric motor which is capable of driving the compressor;
a bypass passage which connects a first section of the intake passage, the first section being positioned upstream more than the compressor, and a second section of the intake passage, the second section being positioned downstream more than the compressor;
a bypass valve which is provided in the bypass passage; an EGR passage which connects the first section positioned upstream more than the compressor, and an exhaust passage; and
an EGR valve which is provided in the EGR passage, wherein
the control system includes a control device configured as a computer unit, the control device being programmed to function as:
a first determination device which determines whether or not a predetermined pressure accumulation condition where a gas flow rate of a specific place of the second section positioned downstream more than the compressor, has become equal to or less than a predetermined amount, is satisfied;
a pressure accumulation control device which, when the pressure accumulation condition is satisfied, first executes a pressure accumulation control to close the bypass valve and make the electric motor drive the compressor;
a second determination device which determines whether or not a predetermined opening condition is satisfied during an execution of the pressure accumulation control; and
a valve open device which, when the opening condition is satisfied, opens the bypass valve and, if the EGR valve is closed, opens the EGR valve.

2. The control system according to claim 1, wherein the pressure accumulation control device, when the electric motor is made to drive the compressor by satisfaction of the pressure accumulation condition, controls the electric motor so that gas is accumulated in the second section positioned downstream more than the compressor in a range where the gas does not flow back to an upstream side of the compressor from a downstream side of the compressor by passing through an inside of the compressor.

3. The control system according to claim 1, wherein the control device is further programmed to function as a condensed water determination device which determines whether or not condensed water is accumulated in the EGR passage, and
the pressure accumulation control device, when the pressure accumulation condition is satisfied and the condensed water determination device determines that the condensed water is accumulated in the EGR passage, first executes the pressure accumulation control, and then, the valve open device, when the opening condition is satisfied during the execution of the pressure accumulation control, opens the bypass valve and, if the EGR valve is closed, opens the EGR valve.

4. The control system according to claim 1, wherein
a throttle valve is provided in a portion which is positioned upstream more than a position where the bypass passage connects with the intake passage and also upstream more than a position where the EGR passage connects with the intake passage, in the first section positioned upstream more than the compressor, and
the pressure accumulation control device opens the throttle valve when the pressure accumulation condition is satisfied, and the valve open device closes the throttle valve when the opening condition is satisfied during the execution of the pressure accumulation control.

5. The control system according to claim 1, wherein
the pressure accumulation control device closes the EGR valve when the pressure accumulation condition is satisfied.

6. The control system according to claim 1, wherein
the internal combustion engine further includes a high pressure EGR passage which connects the second section positioned downstream more than the compressor and the exhaust passage, and
the specific place of the second section is set to a place positioned upstream more than a position where the high pressure EGR passage connects with the intake passage in the second section positioned downstream more than the compressor.

7. The control system according to claim 1, wherein
a turbocharger is provided in the internal combustion engine,
a compressor of the turbocharger is located in the second section positioned downstream more than the compressor, and
a turbine of the turbocharger is located in the exhaust passage.

8. The control system according to claim 1, wherein
the second determination device determines that the opening condition is satisfied in a case where a pressure of gas accumulated in a section lying downstream more than the compressor by the pressure accumulation control has become equal to or greater than a pressure with which condensed water in the EGR passage is blown off to the exhaust passage when the gas accumulated is led into the EGR passage.

9. The control system according to claim 1, wherein the EGR passage is a low pressure EGR passage.

* * * * *